United States Patent [19]

Fujimoto et al.

[11] Patent Number: 4,898,143
[45] Date of Patent: Feb. 6, 1990

[54] EXHAUST GAS RECIRCULATION CONTROL METHOD FOR INTERNAL COMBUSTION ENGINES

[75] Inventors: Sachito Fujimoto; Takuya Sugino, both of Wako, Japan

[73] Assignee: Honda Giken Kogyo K. K. (Honda Motor Co., Ltd. in English), Tokyo, Japan

[21] Appl. No.: 317,824

[22] Filed: Mar. 1, 1989

[30] Foreign Application Priority Data

Mar. 22, 1988 [JP] Japan ................................ 63-67563

[51] Int. Cl.$^4$ ............................................. F02M 25/06
[52] U.S. Cl. ..................................................... 123/571
[58] Field of Search ........................ 123/568, 569, 571

[56] References Cited

U.S. PATENT DOCUMENTS

| | | | |
|---|---|---|---|
| 4,399,791 | 8/1983 | Kobayashi et al. | 123/571 X |
| 4,432,330 | 2/1984 | Otsuka | 123/571 |
| 4,453,379 | 6/1984 | Kawamura et al. | 123/571 X |
| 4,485,794 | 12/1984 | Kimberley et al. | 123/571 X |
| 4,492,209 | 1/1985 | Otani et al. | 123/571 X |
| 4,625,702 | 12/1986 | Onishi | 123/571 |
| 4,750,466 | 6/1988 | Hibino et al. | 123/571 |
| 4,770,148 | 9/1988 | Hibino et al. | 123/571 X |

FOREIGN PATENT DOCUMENTS 0093480  4/1987  Japan .

Primary Examiner—Willis R. Wolfe
Attorney, Agent, or Firm—Arthur L. Lessler

[57] ABSTRACT

An exhaust gas circulation control method for an internal combustion engine in which an exhaust gas recirculating valve is arranged across an exhaust gas recirculating passage extending between the exhaust and intake passages. The opening of the valve is controlled in response to operating conditions of the engine. The exhaust gas circulation is inhibited when the engine load exceeds a predetermined value set in response to the engine temperature such that it is set to a smaller value as the engine temperature is lower.

7 Claims, 4 Drawing Sheets

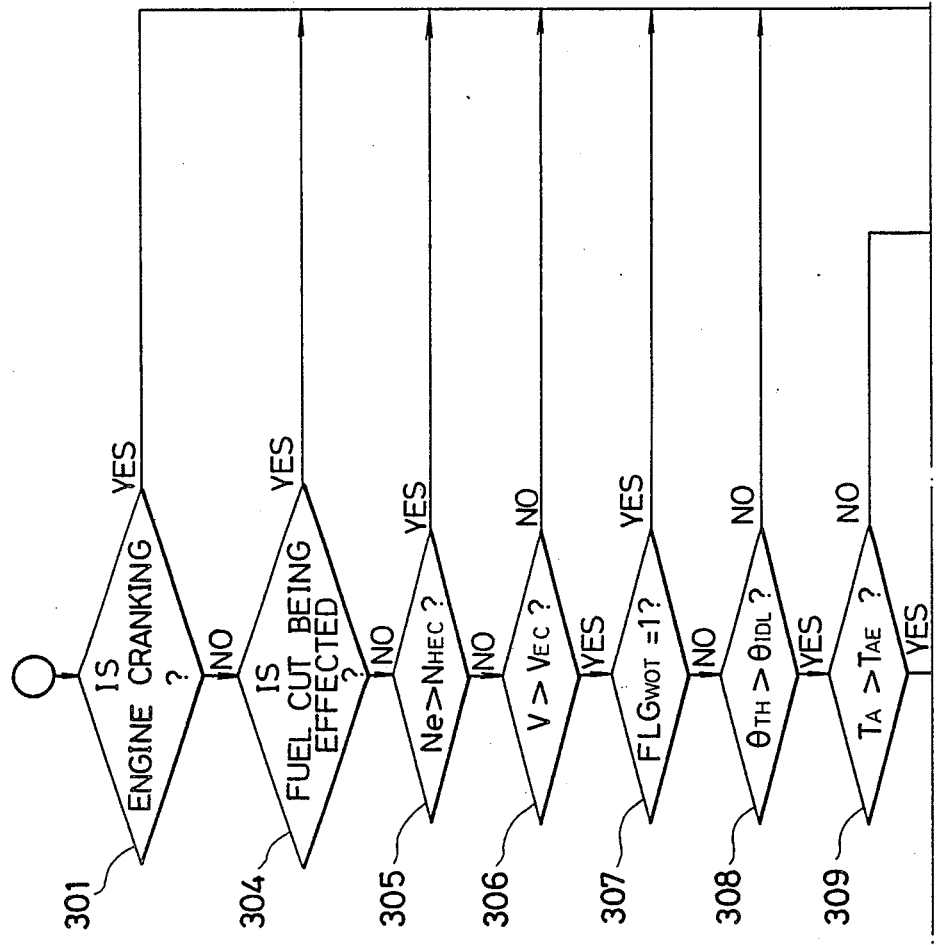

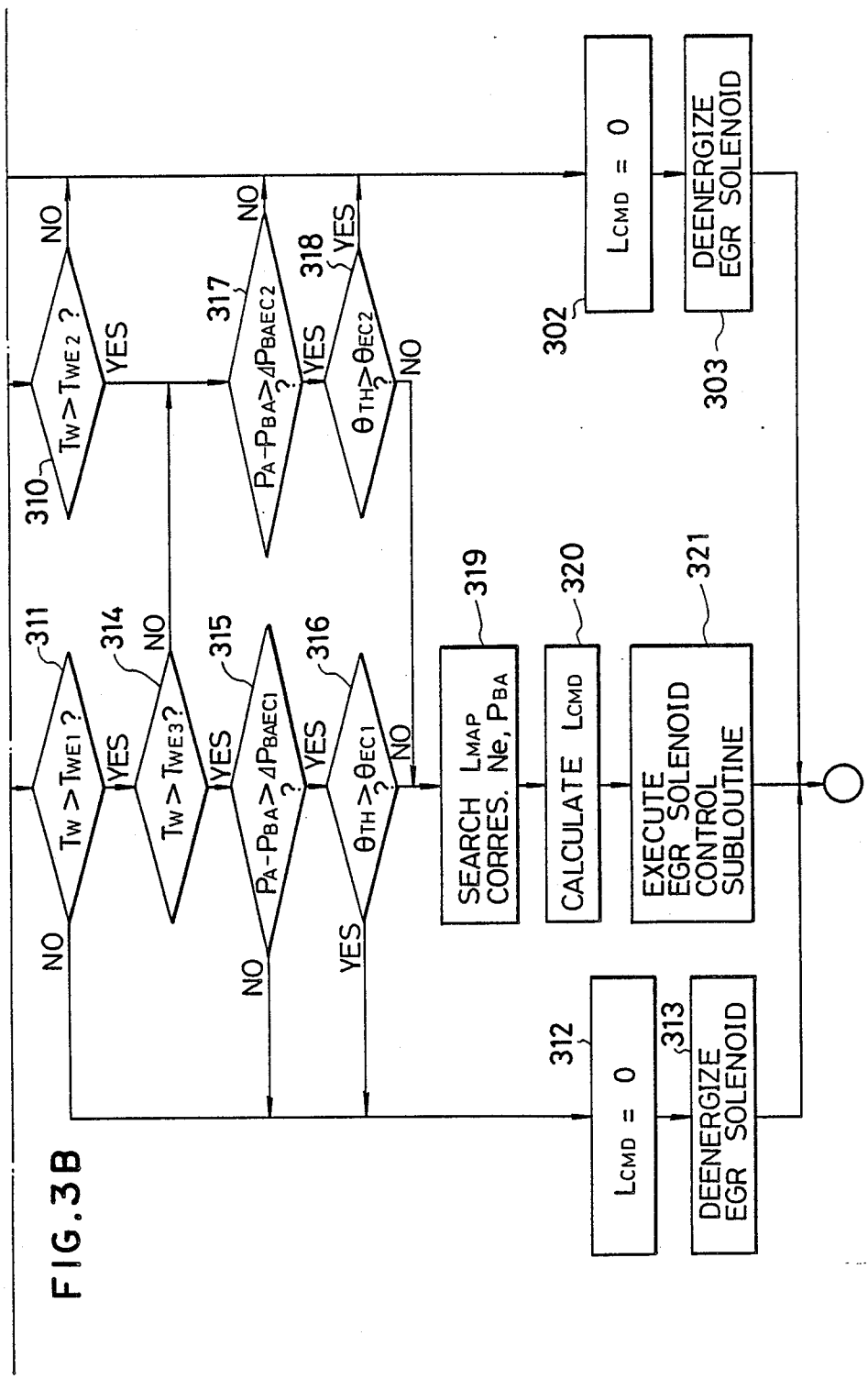

EXHAUST GAS RECIRCULATION CONTROL METHOD FOR INTERNAL COMBUSTION ENGINES

BACKGROUND OF THE INVENTION

This invention relates to an exhaust gas recirculation control method for internal combustion engines, which is intended to reduce a noxious component in the exhaust gases (NOx) without degrading the driveability of the engine, in a high load operating condition of the engine during exhaust gas recirculation at low temperature.

Exhaust gas recirculation, i.e. so-called EGR, is widely employed in internal combustion engines wherein part of exhaust gases from the engine is returned to the intake passage of the engine so as to reduce nitrogen oxides (NOx), one of noxious gases emitted from the engine.

In general, EGR is not effected over all operating regions of the engine, but the operating regions are divided into regions where EGR should be carried out, and regions where EGR should be inhibited, in response to various operating parameters of the engine. For example, an exhaust gas recirculation control method is known e.g. from Japanese Provisional Patent Publication (Kokai) No. 62-93480, in which the EGR is not effected when the engine is in a cold state before being completely warmed up, while the EGR is also inhibited when the engine is operating in a high load condition, such as when the engine rotational speed, the absolute pressure within the intake passage, or the throttle opening exceeds a respective predetermined value.

According to the known exhaust gas recirculation control method, the inhibition of EGR at low engine temperature is intended to promote warming-up of the engine to ensure the stability thereof and also to prevent degradation of the driveability thereof. Although the amount of fuel to be supplied to the engine is usually increased so as to enhance the combustion condition and hence the driveability when the engine temperature is low, EGR would spoil the driveability which could be enhanced by the increased fuel amount. The inhibition of EGR under the predetermined high load condition is intended to enhance the accelerability of the engine under high load condition.

However, in recent years, it has been strongly desired to reduce NOx, e.g. to half of the conventionally allowable amount, from the standpoint of maintaining good environmental quality, and accordingly recent laws and regulations prescribe more strict requirements for reduction of NOx. The requirements can be met to a considerable extent by expanding the engine operating region in which EGR is to be effected.

An effective way to this end is to expand the EGR-effecting operating region even to a low engine temperature region, that is, to effect EGR even when the engine temperature is low. However, there arises a problem in applying the above known method to a low temperature region. For example, if in the low engine temperature region the predetermined value of intake passage absolute pressure above which EGR should be inhibited is set to the same value as that in a higher engine temperature region, it will degrade the driveability of the engine in a high load operating condition at low temperature, making it difficult to ensure satisfactory accelerability. Thus, it is difficult to expand the EGR-effecting region to a low engine temperature region without degrading the driveability.

SUMMARY OF THE INVENTION

It is the object of the invention to provide an exhaust gas recirculation control method for internal combustion engines, which is capable of expanding the engine operating region in which EGR is to be effected without degrading the driveability of the engine when the engine is in a high load operating condition at low temperature.

To attain the object, the present invention provides a method of controlling exhaust gas recirculation in an internal combustion engine having an exhaust passage, an intake passage, an exhaust gas recirculating passage extending between the exhaust passage and the intake passage, and an exhaust gas recirculating valve arranged across the exhaust gas recirculating passage, wherein the opening of the exhaust gas recirculating valve is controlled in response to operating conditions of the engine.

The method of the invention is characterized by comprising the steps of:

(1) detecting an amount of load on the engine;
(2) detecting a value of a temperature of the engine;
(3) setting a predetermined value of load on the engine in response to the detected value of the temperature of the engine; and
(4) inhibiting the exhaust gas recirculation when the detected amount of load of the engine exceeds the predetermined value.

Preferably, the predetermined value is set to smaller value as the detected value of the temperature of the engine is lower.

The amount of load on the engine may be determined based upon pressure within the intake passage.

Preferably, the amount of load on the engine is determined based upon the difference between absolute pressure within the intake passage and atmospheric pressure.

The temperature of the engine may be engine coolant temperature.

Further, the amount of load on the engine is determined based upon the opening of a throttle valve arranged in the intake passage.

The above and other objects, features and advantages of the invention will be more apparent from the ensuing detailed description taken in conjunction with the accompanying drawings.

BRIEF DESCRIPTION OF THE DRAWINGS

FIGS. 3, 3A, and 3B are a flowchart of a manner of controlling the exhaust gas recirculation according to the method of the invention.

DETAILED DESCRIPTION

The method of the invention will now be described in detail with reference to the drawings.

Figure 1:
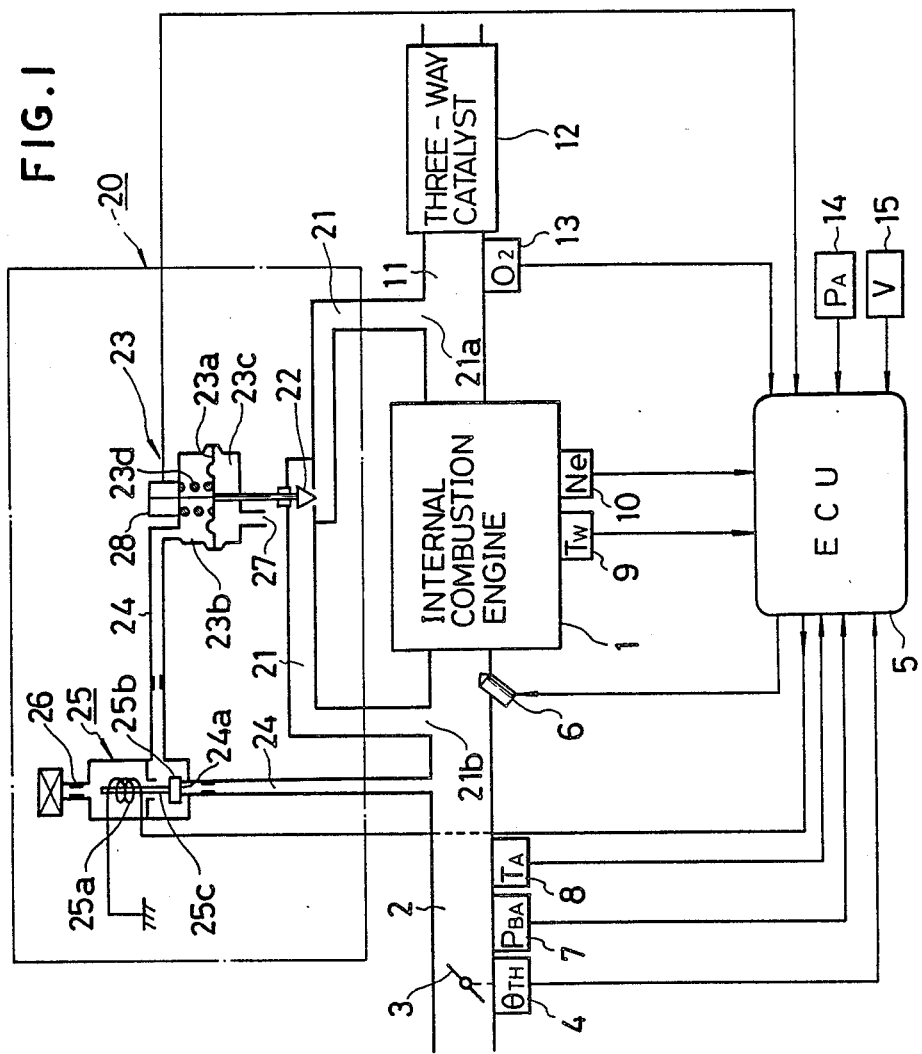
FIG. 1 is a block diagram of the whole arrangement of an internal combustion engine equipped with an exhaust gas recirculation control system to which is applied the method according to the invention.

Referring first to FIG. 1, there is illustrated the whole arrangement of an exhaust gas recirculation control system for an internal combustion engine, to which is applied the method according to the invention. Reference numeral 1 designates an internal combustion engine which may be a four-cylinder type, for instance. An intake pipe (intake passage) 2 is connected to the cylinder block of the engine 1, in which is arranged a throttle valve 3, to which is coupled a throttle valve opening ($\theta_{TH}$) sensor 4 for detecting its valve opening and converting same into an electrical output signal which is supplied to an electronic control unit (hereinafter called "the ECU") 5.

Fuel injection valves 6 are arranged in the intake pipe 2 at locations intermediate between the cylinder block of the engine 1 and the throttle valve 3, which are provided, respectively, for cylinders, not shown, of the engine and projected into the intake pipe 2 at locations lightly upstream of respective intake valves. Each of the fuel injection vales 6 is connected to a fuel pump, not shown, and electrically connected to the ECU 5 to have their valve opening periods for fuel injection controlled by drive signals therefrom.

An absolute pressure ($P_{BA}$) sensor 7 is connected to the intake pipe 2 at a location downstream of the throttle valve 3, to supply an electrical output signal indicative of the detected absolute pressure in the intake pipe 2 to the ECU 5. An intake air temperature ($T_A$) sensor 8 is connected to the intake pipe 2 at a location downstream of the absolute pressure sensor 7 to supply an electrical output signal indicative of the detected intake air temperature $T_A$ to the ECU 5.

An engine coolant temperature ($T_W$) sensor 9, which may be formed of a thermistor or the like, is mounted on the cylinder block of the engine 1 in a manner embedded in the peripheral wall of an engine cylinder having its interior filled with cooling water, an electrical output signal of which is supplied to the ECU 5.

An engine rotational speed ($N_e$) sensor (hereinafter called "the $N_e$ sensor") 10 is arranged in facing relation to a camshaft, not shown, of the engine 1 or a crankshaft of same, not shown. The $N_e$ sensor 10 is adapted to generate one pulse at one of particular crank angles of the engine whenever the engine crankshaft rotates through 180 degrees, as a pulse indicative of a top-dead-center position (TDC signal). Pulses from the $N_e$ sensor 10 are supplied to the ECU 5.

A three-way catalyst 12 is arranged in an exhaust pipe (exhaust passage) 11 extending from the cylinder block of the engine 1 for purifying ingredients HC, CO and NOx contained in the exhaust gases. An $O_2$ sensor 13 is inserted into the exhaust pipe 11 at a location upstream of the three-way catalyst 12 for detecting the concentration of oxygen in the exhaust gases and supplying an electrical output signal indicative of the detected concentration value to the ECU 5.

Further connected to the ECU 5 is an atmospheric pressure ($P_A$) sensor 14 for detecting atmospheric pressure $P_A$, to supply an electrical output signal indicative of the detected atmospheric pressure to the ECU 5.

Also connected to the ECU 5 are a vehicle speed (V) sensor 15 and other sensors and switches, not shown. The sensor 15 is for detecting the vehicle speed V to supply an electric output signal indicative of the detected vehicle speed to the ECU 5.

An exhaust gas recirculation mechanism 20 forming part of the exhaust gas recirculation control system will now be described. An exhaust gas recirculating passage 21 is connected at one end 21a to the exhaust pipe 11 at a location upstream of the three-way catalyst 12, and at the other end 21b to the intake pipe 2 at a location downstream of the throttle valve 3. An exhaust gas recirculating valve 22 is arranged across the exhaust gas recirculating passage 21 for regulating or varying the amount of exhaust gases being returned to the intake pipe 2. The exhaust gas recirculating valve 22 has its valve body operatively coupled to a diaphragm 23a of a vacuum-responsive actuator 23. The actuator 23 has a vacuum chamber 23b and a lower or atmospheric pressure chamber 23c partly defined by the diaphragm 23a. A spring 23d is arranged in the vacuum chamber 23b and urges the diaphragm 23a in the direction of closing the exhaust gas recirculating valve 22. The lower chamber 23c is communicated with the atmosphere by way of an air or atmospheric pressure passage 27, while the vacuum chamber 23b is communicated with the interior of the intake pipe 2 at a location downstream of the throttle valve 3 by way of a vacuum passage 24 having restrictions therein. A three-way solenoid valve 25 is arranged across the vacuum passage 24, which has a solenoid 25a electrically connected to the ECU 5, a valve body 25b displaceable in response to energization and deenergization of the solenoid 25a to close and open an opening 25c communicating with the atmosphere via an atmospheric pressure passage 26 provided with a filter and a restriction therein. When the solenoid 25a is energized, the valve body 25b is displaced to close the opening 25c and simultaneously open the vacuum passage 24 at an opening 24a thereof so that negative pressure or vacuum developed in the intake pipe 2 at a zone downstream of the throttle valve 3 is delivered into the vacuum chamber 23b of the vacuum-operated actuator 23. As a result, there will be developed a difference between pressures acting upon the opposite side surfaces of the diaphragm 23a so that the diaphragm 23a is displaced against the force of the spring 23d to open the exhaust gas recirculating valve 22. More specifically, upon energization of the solenoid 25a of the three-way valve 25, the exhaust gas recirculating valve 22 has its valve opening increased to allow an increased amount of exhaust gases to flow through the exhaust gas recirculating passage 21 to the intake pipe 2. On the other hand, when the solenoid 25a of the three-way valve 25 is deenergized, the valve body 25b is displaced to close the opening 24a of the vacuum passage 24 and simultaneously open the opening 25c so that atmospheric pressure is introduced into the vacuum chamber 23b of the vacuum-responsive actuator 23. On this occasion, the pressure difference between pressures acting upon the opposite side surfaces of the diaphragm 23a becomes almost zero whereby the diaphragm 23a is displaced by the force of the spring 23d to bring the exhaust gas recirculating valve 22 into a fully closed position. As long as the solenoid 25a of the three-way valve 25 continues to be thus energized, the exhaust gas recirculating valve 22 is kept fully closed to interrupt the exhaust gas recirculation.

In FIG. 1, reference numeral 28 designates a valve lift sensor connected to the diaphragm 23a of the vacuum-responsive actuator device 23 for detecting the displacement of the diaphragm 23a, that is, the actual valve opening of the exhaust gas recirculating valve 22. This sensor 28 is also electrically connected to the ECU 5.

The ECU 5 determines operating conditions of the engine on the basis of various engine operating parameter signals from the aforementioned sensors, sets a desired valve opening command value $L_{CMD}$ for the exhaust gas recirculating valve 22 as a function of the intake pipe absolute pressure $P_{BA}$ and the engine rotational speed $N_e$, and supplies a control signal in the form of on-off pulses to the three-way valve 25 to energize same so as to make zero the difference between the desired valve opening command value $L_{CMD}$ and the actual valve opening value $L_{ACT}$ of the exhaust gas recirculating valve 22. The ECU 5 further calculates the fuel injection period, i.e. the valve opening period TOUT for the fuel injection valves 6, by the use of the following equation:

$$T_{OUT} = T_i \times K_1 + K_2 \qquad (1)$$

where $T_i$ represents a basic value of the fuel injection period, which is calculated as a function of the intake passage absolute pressure $P_{BA}$ and the engine rotational speed $N_e$ as well as in dependence on whether or not the three-way solenoid valve 25 for controlling the exhaust gas recirculating amount is operating, as hereinafter described. $K_1$ and $K_2$ represent, respectively, correction coefficients and correction variables having their values calculated in accordance with the values of output signals from the aforementioned various sensors, that is, the throttle valve opening sensor 4, the intake passage absolute pressure sensor 7, the intake air temperature sensor 8, the engine coolant temperature sensor 9, the $N_e$ sensor 10, the $O_2$ sensor 13, the atmospheric pressure sensor 14, and the vehicle speed sensor 15, etc. and are calculated by the use of respective predetermined equations, maps, etc. so as to optimize characteristics of the engine such as startability, emission characteristics, fuel consumption, and accelerability of the engine, etc.

The ECU 5 supplies driving signals to the fuel injection valves 6 to open same for a period of time corresponding to the valve opening period TOUT calculated in the manner described above.

Figure 2:
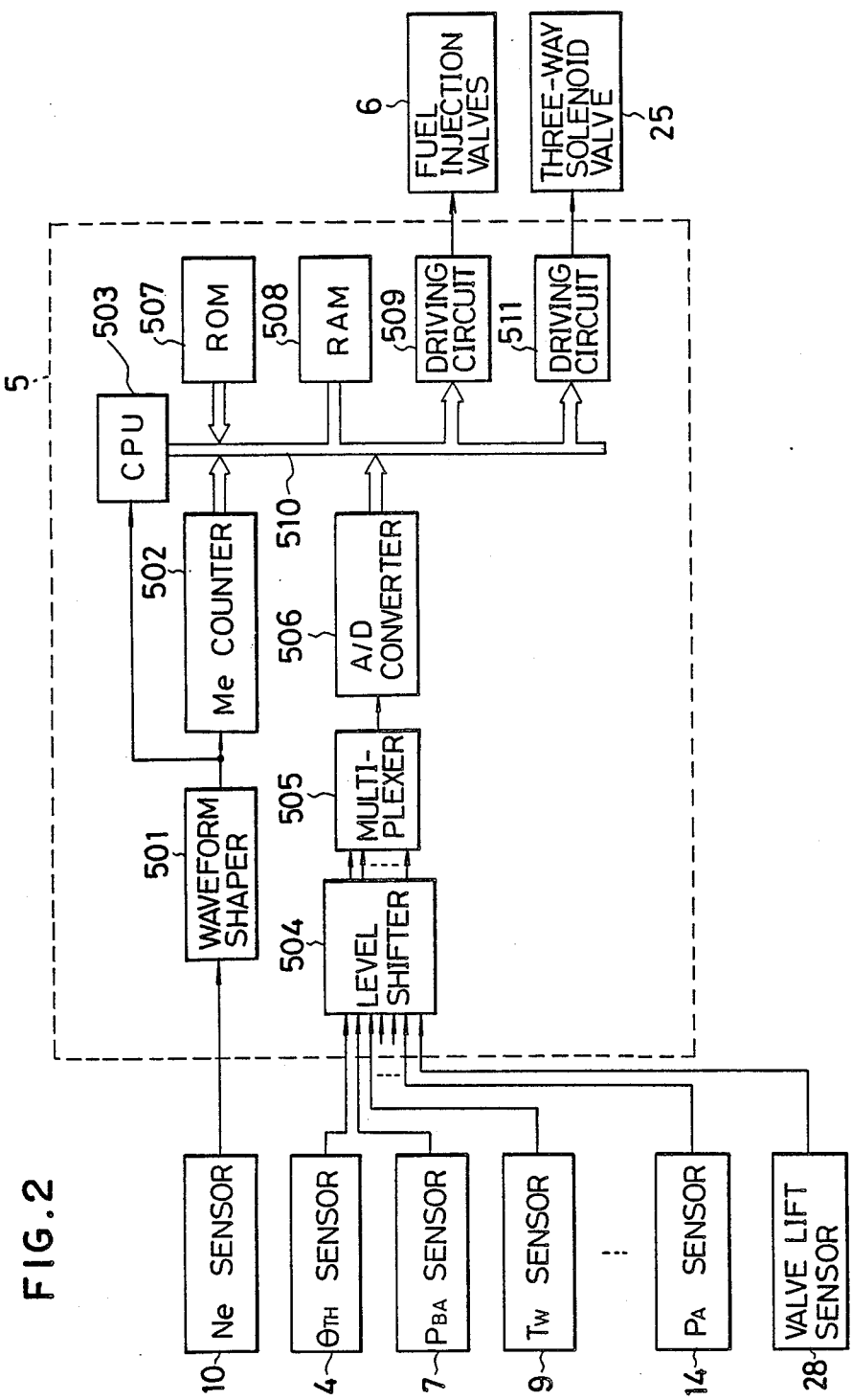
FIG. 2 is a circuit diagram of the internal configuration of an electronic control unit (ECU) appearing in FIG. 1.

FIG. 2 shows an electrical circuit within the ECU 5 in FIG. 1. An output signal from the $N_e$ sensor 10 in FIG. 1 is applied to a waveform shaper unit 501, wherein its pulse waveform is shaped, and the shaped signal is supplied to a central processing unit (hereinafter called "the CPU") 503 as an interrupt signal for starting a program shown in FIG. 3, as well as to an $M_e$ value counter 502, as the TDC signal. The $M_e$ value counter 502 counts the time interval between a preceding pulse of the TDC signal and a present pulse of the same signal, inputted thereto from the $N_e$ sensor 10. Therefore, its counted value $M_e$ corresponds to the reciprocal of the actual engine rotational speed $N_e$. The $M_e$ value counter 502 supplies the counted value $M_e$ to the CPU 503 via a data bus 510.

The respective output signals from the throttle valve opening sensor 4, the intake pipe absolute pressure sensor 7, the engine coolant temperature sensor 9, the valve lift sensor 28, and other engine operating parameter analog-output sensors, not shown, have their voltage levels shifted to a predetermined voltage level by a level shifter unit 504 and successively applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 510.

Further connected to the CPU 503 via the data bus 510 are a read-only memory (hereinafter called "the ROM") 507, a random access memory (hereinafter called "the RAM") 508, and driving circuits 509 and 511. The RAM 508 temporarily stores various calculated values from the CPU 503, while the ROM 507 stores control programs to be executed within the CPU 503 such as one for controlling the exhaust gas recirculation, as hereinafter described.

The CPU 503 executes the control programs in such a manner that it is responsive to output signals from the various engine operating parameter sensors to determine operating conditions of the engine, supply a control signal to the driving circuit 511, which in turn supplies a corresponding driving signal to the three-way solenoid valve 25 for on-off control of same to thereby control the exhaust gas recirculating amount, while it calculates the fuel injection period $T_{OUT}$ for the fuel injection valves 6 in response to the determined operating conditions of the engine, and supplies a control signal corresponding to the calculated value to the driving circuit 509 via the data bus 510. The driving circuit 509 supplies a corresponding driving signal to the fuel injection valves 6 to open same.

The exhaust gas recirculation control method of the invention will now be described in detail, which is to be applied to the system constructed as above.

FIG. 3 shows a flowchart showing a program executed by the ECU 5 for effecting the exhaust gas recirculation control. The program is executed in synchronism with TDC signal pulses.

At a step 301, it is determined whether or not the engine 1 is in a cranking state. The determination of the cranking state can be made by determining whether or not a starting switch, not shown, for turning on or off the engine starter is in on state, and at the same time the engine rotational speed $N_e$ is lower than a predetermined value, e.g. 400 rpm.

If the answer is Yes, the program proceeds to a step 302, where the valve opening command value $L_{CMD}$ for the exhaust gas recirculating valve 22 is set to 0, whereby the solenoid 25a of the three-way solenoid valve 25 is kept in off state at a step 303, followed by termination of the program. The valve 25 thus deenergized inhibits the exhaust gas recirculation control, thereby ensuring complete firing of the engine 1 at starting.

On the other hand, if the answer to the question of the step 301 is No, that is, if the engine 1 is not in the cranking state, the program proceeds to a step 304, where it is determined whether or not fuel-cut is being effected. The determination at the step 304 is carried out based upon respective values of the engine rotational speed, the absolute pressure within the intake pipe 2, and the throttle opening which are respectively detected by the $N_e$ sensor 10, the throttle valve opening sensor 4, and the absolute pressure sensor 7.

If the answer is Yes, the steps 302 and 303 are executed, followed by termination of the program. That is, since nitrogen oxides NOx are not emitted while fuel-cut is being effected, the solenoid 25a is also deenergized during fuel-cut to avoid unnecessary energization of the solenoid and hence enhance the durability of the three-way solenoid valve 25.

If the answer at the step 304 is No, the program proceeds to a step 305, where it is determined whether or not the engine rotational speed $N_e$ is higher than a predetermined value $N_{HEC}$, e.g. 3000 rpm, for determining whether the engine 1 is in a high speed operating condition. If the answer is Yes, that is, if $N_e > N_{HEC}$, the steps 302 and 303 are executed, followed by termination of the program. Therefore, a drop in the engine output is prevented during the high speed operating condition.

If the answer at the step 305 is No, that is, if $N_e \leq N_{HEC}$, the program proceeds to a step 306, where it is determined whether or not the vehicle speed V is higher than a predetermined value $V_{EC}$, e.g. 5 km/h, for determining whether the vehicle is at a low speed or stopped. If the answer is No, that is, if $V \leq V_{EC}$, the steps 302 and 303 are executed, followed by termination of the program. Thus, stable combustion of the engine 1 can be obtained at low speed operation of the vehicle or parking thereof.

If the answer at the step 306 is Yes, that is, if $V > V_{EC}$, the program proceeds to a step 307, where it is determined whether or not a flag $FLG_{WOT}$ is equal to 1. The flag $FLG_{WOT}$ indicates whether or not the engine 1 is in a high load operating condition in which the amount of fuel supplied to the engine 1 is increased. The flag $FLG_{WOT}$ is set to 1 or 0 in response to the absolute pressure $P_{BA}$, the engine rotational speed $N_e$, and the throttle valve opening $\theta_{TH}$, by executing a control program, not shown. The value 1 of the flag $FLG_{WOT}$ indicates that the engine 1 is in the high load operating condition in which the amount of fuel supplied to the engine 1 is increased. Therefore, if the answer at the step 307 is Yes, the steps 302 and 303 are executed, followed by termination of the program.

That is, if the flag $FLG_{WOT}$ is set to 1, EGR is inhibited to avoid a drop in the engine output.

If the answer at the step 307 is No, that is, if the flag $FLG_{WOT}$ is set to 0, the program proceeds to a step 308, where it is determined whether or not the throttle valve opening $\theta_{TH}$ is larger than a predetermined value $\theta_{IDL}$, e.g. 0.5 degrees, for determining whether the engine 1 is in an idling operating condition. If the answer is No, that is, if $\theta_{TH} \leq \theta_{IDL}$, the steps 302 and 303 are executed, followed by termination of the program. Therefore, also when the engine 1 is in the idling condition, EGR is inhibited, thereby preventing unnecessary recirculation of exhaust gases.

If the answer at the step 308 is Yes, that is, if $\theta_{TH} > \theta_{IDL}$, the program proceeds to a step 309 et seq., where it is determined whether the engine is operating in a region in which EGR is to be effected or in a region in which it is to be inhibited, in response to other engine parameters such as the engine coolant temperature $T_W$.

At the step 309 it is determined whether or not the intake air temperature $T_A$ is higher than a predetermined value $T_{AE}$, e.g. 20° C.

If the answer at the step 309 is No, that is, if the intake air temperature is low, it is determined at a step 310 whether or not the engine coolant temperature $T_W$ is higher than a second predetermined value $T_{WE2}$, e.g. 70° C., which is the highest value as the EGR control starting temperature.

If the answer is No, that is, if $T_W < T_{WE2}$, the steps 302 and 303 are executed, followed by termination of the program. Therefore, engine stalling can be prevented, which would be caused by effecting EGR during warming-up of the engine 1.

If the answer at the step 310 is Yes, that is, if $T_W > T_{WE2}$, the program proceeds to a step 317 et seq., hereinafter described, to determine in response to other engine parameters whether or not EGR should be effected.

On the other hand, if the answer at the step 309 is Yes, that is, if $T_A > T_{AE}$, it is determined at a step 311 whether or not the engine coolant temperature $T_W$ is higher than a first predetermined value $T_{WE1}$, e.g. 40° C., which is lower than the second predetermined value $T_{WE2}$. If the answer is No, that is, if $T_W \leq T_{WE1}$, similarly at the steps 302 and 303, the valve opening command value $L_{CMD}$ is set to 0 at a step 312, to keep the solenoid 25a of the three-way valve 25 in off state at the next step 313, followed by termination of the program.

The step 311 is provided for inhibiting EGR when the engine coolant temperature $T_W$ is very low, irrespective of the values of the other engine parameters. That is, when the engine coolant temperature $T_W$ is below the first predetermined value $T_{WE1}$, EGR is not effected, irrespective of the value of intake air temperature $T_A$, thereby preventing degradation in the driveability due to EGR at a low engine coolant temperature. If the answer at the step 311 is Yes, that is, if $T_W > T_{WE1}$, it is determined at a step 314 whether or not the engine coolant temperature $T_W$ is higher than a third predetermined value $T_{WE3}$, e.g. 60° C. The third predetermined value $T_{WE3}$ is higher than the first predetermined value $T_{WE1}$, but lower than the second predetermined value $T_{WE2}$.

If the answer at the step 314 is Yes, that is, if $T_W > T_{WE3}$, it is determined at the next step 315 whether or not the difference between atmospheric pressure $P_A$ and the intake pipe absolute pressure $P_{BA}$ is larger than a first predetermined value $\Delta P_{BAEC1}$, e.g. 70 mmHg. If the answer is No, that is, if $P_A - P_{BA} \leq \Delta P_{BAEC1}$, it is decided that the engine 1 is in a high load operating condition, followed by the program proceeding to the steps 312 and 313 and then being terminated.

Thus, when the difference $(P_A - P_{BA})$ is small, EGR is inhibited, in order to enhance the accelerability of the engine 1 and hence the driveability of same in a high load operating condition. Further, since the load of the engine 1 is determined not directly from the intake pipe absolute pressure $P_{BA}$, but from the difference $(P_A - P_{BA})$, inaccurate opening and closing of the exhaust gas recirculating valve 22, which is liable to take place under low atmospheric pressure in a high altitude or the like, can be avoided to thereby enhance the stability of the engine 1.

If the answer at the step 315 is Yes, that is, if $P_A - P_{BA} > \Delta P_{BAEC1}$, it is determined at a step 316 whether or not the throttle valve opening $\theta_{TH}$ ios larger than a first predetermined value $\theta_{EC1}$, e.g. 40 degrees. If the answer is Yes, that is, if $\theta_{TH} > \theta_{EC1}$, it is decided that the engine 1 is in a high load operating condition, followed by the program executing steps 312 and 313 and then being terminated. That is, also when the throttle valve opening $\theta_{TH}$ is so large that high engine output is required, EGR is inhibited even if $P_A - P_{BA} > \Delta P_{BAEC1}$, thereby enhancing the accelerability of the engine 1 in a high load condition.

If the answer at the step 316 is No, that is, if $\theta_{TH} \leq \theta_{EC1}$, it is decided that the engine 1 is in an operating condition in which EGR should be effected, followed by the program proceeding to a step 319 et seq., hereinafter described, where EGR is effected.

In the meanwhile, if the answer at the step 310 is Yes, that is, if $T_W > T_{WE2}$ at a low intake air temperature, as described hereinbefore, or if the answer at the step 314 is No, that is, if $T_{WE1} < TW \leq T_{WE2}$, the program proceeds to a step 317, where it is determined whether or not the difference between atmospheric pressure $P_A$ and the take pipe absolute pressure $P_{BA}$ is larger than a second predetermined value $\Delta P_{BAEC2}$, e.g. 200 mmHg. If the answer is No, that is, if $P_A - P_{BA} \leq \Delta P_{BAEC2}$, the steps 302 and 303 are executed to inhibit EGR, followed by termination of the program.

If the answer at the step 317 is Yes, it is determined at a step 318 whether or not the throttle valve opening $\theta_{TH}$ is larger than a second predetermined value $\theta_{EC2}$, e.g. 20 degrees. If the answer at the step 318 is Yes, that is, if $\theta_{TH} > \theta_{EC2}$, the steps 302 and 303 are executed, followed by termination of the program. On the other hand, if the answer at the step 318 is No, it is decided that the engine 1 is in the operating condition in which EGR should be carried out, followed by the program proceeding to a step 319 et seq.

As described above, at the steps 315-318, the two predetermined reference values $\Delta P_{BAEC1}$ and $\Delta P_{BAEC2}$ are selectively used, for comparison with the difference $(P_A - P_{BA})$, and the predetermined reference values $\theta_{EC1}$ and $\theta_{EC2}$ for comparison with the throttle valve opening $\theta_{TH}$, in response to the engine coolant temperature $T_W$. This is based on the following ground:

Since the concentration of NOx is lower as the combustion temperature is lower, it is unnecessary to effect EGR at low coolant temperature ($T_{WE1} < T_W \leq T_{WE3}$) where fuel does not burn well and the combustion temperature is low. On the contrary, if EGR is effected in such a condition, it will degrade the driveability of the engine 1. Therefore, it is required to expand the engine operating region in which EGR is to be inhibited, when the engine coolant temperature $T_W$ is low. On the other hand, when the engine coolant temperature $T_W$ is high ($T_W > T_{WE3}$), the concentration of NOx is relatively high, and at the same time EGR will not exert so adverse an influence upon the driveability of the engine. Therefore, it is desirable, under predetermined conditions, to expand the engine operating region in which EGR is to be effected.

By virtue of the steps 315-318, the driveability of the engine 1 can be enhanced in the high load operating condition at low temperature, and also the engine operating region in which EGR is to be carried out can be expanded at low temperature to thereby reduce NOx in the exhaust gases.

Thus, if the answer at the step 316 or 318 is No, EGR is carried out at the step 319 et seq. Specifically, at the step 319 a valve opening basic value $L_{MAP}$ for the exhaust gas recirculating valve 22 is read from a map, not shown, stored in the ROM 507 as a function of the engine rotational speed $N_e$ and the intake pipe absolute pressure $P_{BA}$. At the next step 320, the valve opening command value $L_{CMD}$ is calculated based upon the read valve opening basic value $L_{MAP}$, to energize the solenoid 25a of the three-way solenoid valve 25 by applying a driving signal corresponding to the calculated value $L_{MAP}$, at a step 321, followed by termination of the program. That is, on-off duty ratio control of the three-way solenoid valve 25 is effected in response to the difference between the actual valve opening $L_{ACT}$ of EGR valve 22 and the valve opening command value $L_{CMD}$ determined at the step 320, to thereby effect EGR.

What is claimed is:

1. A method of controlling exhaust gas recirculation in an internal combustion engine having an exhaust passage, an intake passage, an exhaust gas recirculating passage extending between said exhaust passage and said intake passage, and an exhaust gas recirculating valve arranged across said exhaust gas recirculating passage, wherein the opening of said exhaust gas recirculating valve is controlled in response to operating conditions of said engine, the method comprising the steps of:
   (1) detecting an amount of load on said engine;
   (2) detecting a value of a temperature of said engine;
   (3) setting a predetermined value of load on said engine in response to the detected value of the temperature of said engine; and
   (4) inhibiting the exhaust gas recirculation when the detected amount of load of said engine exceeds said predetermined value.

2. A method as claimed in claim 1, wherein said predetermined value is set to a smaller value as the detected value of the temperature of said engine is lower.

3. A method as claimed in claim 1 or 2, wherein the amount of load on said engine is determined based upon pressure within said intake passage.

4. A method as claimed in claim 1 or 2, wherein the amount of load on said engine is determined based upon the difference between absolute pressure within said intake passage and atmospheric pressure.

5. A method as claimed in claim 1, wherein the amount of load on said engine is determined based upon the opening of a throttle valve arranged in said intake passage.

6. A method as claimed in claim 1, wherein the temperature of said engine is engine coolant temperature.

7. A method as claimed in claim 1, including the step of detecting intake air temperature of said engine, and wherein said step (3) is executed when the detected intake air temperature exceeds a predetermined value.

* * * * *